United States Patent
Yin et al.

(10) Patent No.: US 11,061,849 B2
(45) Date of Patent: Jul. 13, 2021

(54) ADAPTIVE TRANSMITTER PRESET MECHANISM IN PCIE LINK EQUALIZATION PROCEDURE

(71) Applicant: DELL PRODUCTS L.P., Round Rock, TX (US)

(72) Inventors: Chambers Yin, Shanghai (CN); Jason Pritchard, Hopkinton, MA (US); Andy Qiang Liu, Shanghai (CN); James E. Roche, Rehoboth, MA (US); Lynn Lingyu Kong, Shanghai (CN); Jeremy Qiu, Shanghai (CN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 16/655,748

(22) Filed: Oct. 17, 2019

(65) Prior Publication Data
US 2021/0117363 A1    Apr. 22, 2021

(51) Int. Cl.
G06F 13/00 (2006.01)
G06F 13/42 (2006.01)
G06F 13/12 (2006.01)

(52) U.S. Cl.
CPC ........ *G06F 13/4221* (2013.01); *G06F 13/126* (2013.01); *G06F 13/4286* (2013.01); *G06F 2213/0026* (2013.01)

(58) Field of Classification Search
CPC ............. G06F 13/4221; G06F 13/4282; G06F 13/4291; G06F 2213/0026
USPC ........................................................ 710/313
See application file for complete search history.

(56) References Cited

U.S. PATENT DOCUMENTS

| | | | |
|---|---|---|---|
| 8,599,913 B1 * | 12/2013 | Brown ................ | G06F 13/4027 375/232 |
| 9,124,455 B1 * | 9/2015 | Lim ................... | H04L 25/03343 |
| 9,785,604 B2 | 10/2017 | Mejia et al. | |
| 10,474,607 B2 | 11/2019 | Venkatesan et al. | |
| 2013/0051483 A1 * | 2/2013 | Wyatt ............... | H04L 25/03885 375/259 |
| 2013/0145212 A1 * | 6/2013 | Hsu ..................... | G06F 11/2733 714/27 |
| 2014/0092952 A1 * | 4/2014 | Aguilar-Arreola | ......................... H04L 25/03343 375/233 |
| 2014/0181339 A1 * | 6/2014 | Hopgood ............. | G06F 13/385 710/107 |
| 2014/0281068 A1 * | 9/2014 | Das Sharma ....... | G06F 13/4282 710/104 |

(Continued)

FOREIGN PATENT DOCUMENTS

DE    112013004799 T5    7/2015
EP         2778938 A2    9/2014

(Continued)

*Primary Examiner* — Titus Wong
(74) *Attorney, Agent, or Firm* — Jackson Walker LLP; Christopher J. Rourk

(57) ABSTRACT

A system for data communications, comprising an upstream component configured to select an in-band peripheral component interconnect express (PCIe) equalization procedure or an out-of-band PCIe equalization procedure and a downstream component configured to respond to the selected one of the in-band PCIe equalization procedure or the out-of-band PCIe equalization procedure to enable PCIe communications with the upstream component.

20 Claims, 2 Drawing Sheets

(56) References Cited

U.S. PATENT DOCUMENTS

| | | | |
|---|---|---|---|
| 2015/0092828 A1* | 4/2015 | Desimone | H04L 25/03885 |
| | | | 375/226 |
| 2015/0110165 A1* | 4/2015 | Ramadoss | H04L 25/03343 |
| | | | 375/233 |
| 2016/0080179 A1* | 3/2016 | He | H04L 25/03878 |
| | | | 375/233 |
| 2016/0218888 A1* | 7/2016 | Patel | H04L 25/03878 |
| 2018/0091181 A1 | 3/2018 | Alderrou et al. | |
| 2018/0181502 A1 | 6/2018 | Jen et al. | |
| 2018/0331864 A1 | 11/2018 | Das Sharma | |
| 2019/0034376 A1 | 1/2019 | Das Sharma | |

FOREIGN PATENT DOCUMENTS

| | | |
|---|---|---|
| JP | 5809726 B2 | 9/2014 |
| KR | 101603153 B1 | 3/2016 |

* cited by examiner

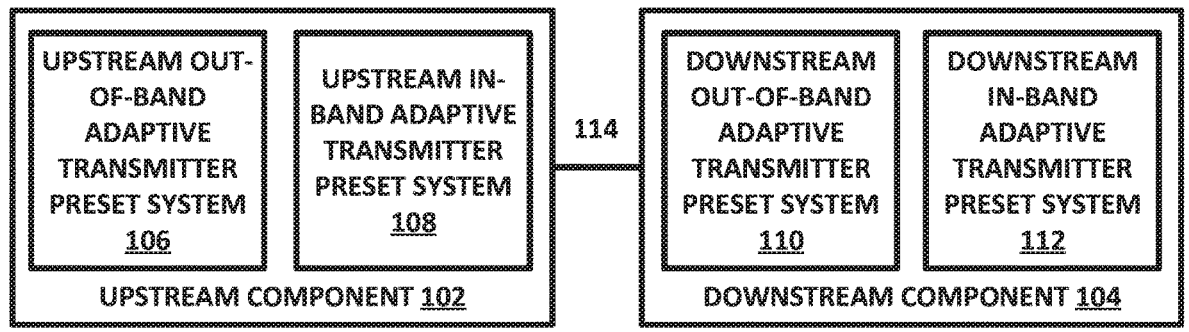
FIGURE 1    100
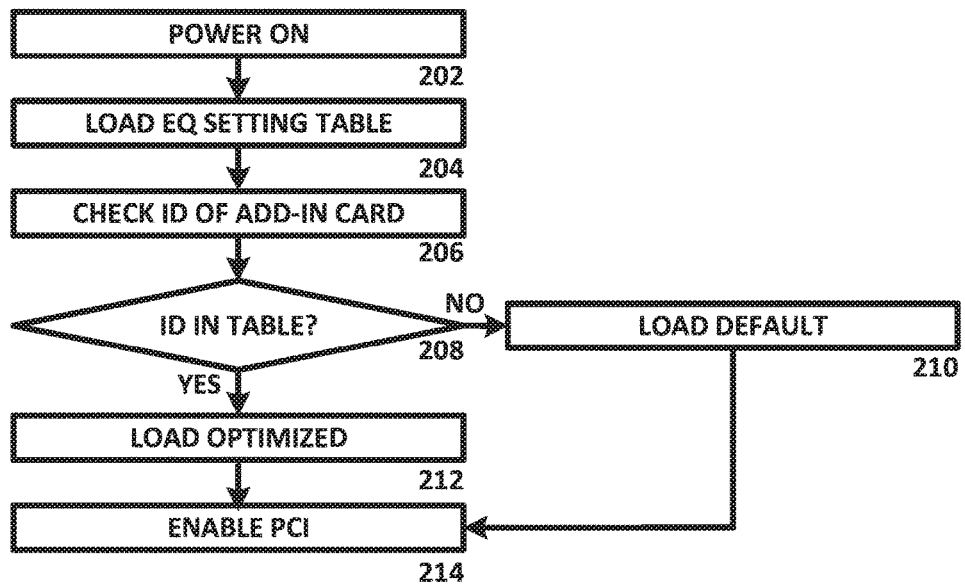
FIGURE 2    200

ADAPTIVE TRANSMITTER PRESET MECHANISM IN PCIE LINK EQUALIZATION PROCEDURE

TECHNICAL FIELD

The present disclosure relates generally to data communications, and more specifically to an adaptive transmitter preset mechanism in a PCIe link equalization procedure.

BACKGROUND OF THE INVENTION

In normal peripheral component interconnect express (PCIe) communications, a downstream transmitter preset value is controlled by an upstream component. That transmitter preset value is not optimized for every add-in card.

SUMMARY OF THE INVENTION

A system for data communications is disclosed that includes an upstream component that is configured to select an in-band PCIe equalization procedure or an out-of-band PCIe equalization procedure. A downstream component is configured to respond to the selected one of the in-band PCIe equalization procedure or the out-of-band PCIe equalization procedure to enable PCIe communications with the upstream component.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which:

FIG. 1 is a diagram of a system for providing an adaptive transmitter preset mechanism in a PCIe link equalization procedure, in accordance with an example embodiment of the present disclosure;

FIG. 2 is a diagram of an algorithm for providing an out-of-band adaptive transmitter preset mechanism in a PCIe link equalization procedure, in accordance with an example embodiment of the present disclosure.

DETAILED DESCRIPTION OF THE INVENTION

Figure 3:
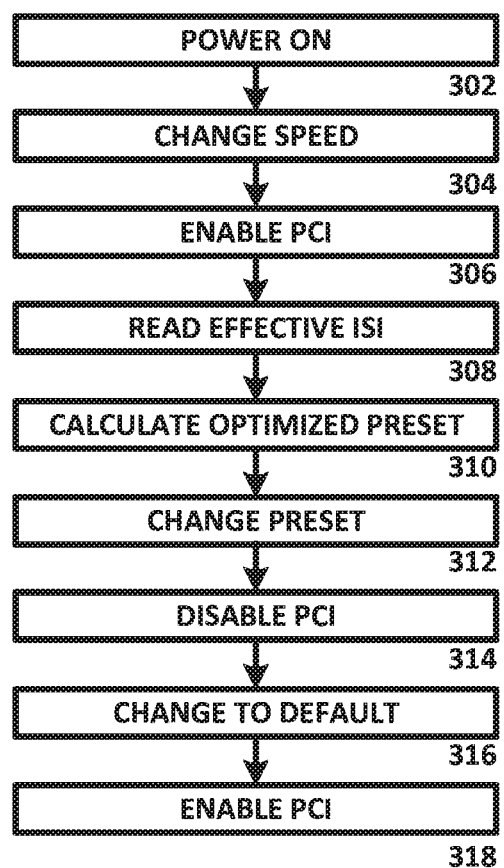
FIG. 3 is a diagram of an algorithm for providing an in-band adaptive transmitter preset mechanism in a PCIe link equalization procedure, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

The present disclosure is directed to an optimized link tuning algorithm for PCIe, to improve signal integrity performance and to avoid generation of errors due to loss of tuning, non-optimal link tuning or incorrect serializer/deserializer (SerDes) setting. In the prior art PCIe link equalization procedure, the downstream transmitter preset value is controlled by the upstream component (USC). The transmitter preset value is not optimized based on the capability of the downstream component (DSC) receiver's equalizer and loss on the add-in card associated with the DSC.

Two types of novel adaptive transmitter preset mechanisms are provided in the present disclosure. These mechanisms are compatible with PCIe specification generations 3/4/5, and include an out-of-band signal embodiment and an in-band signal embodiment. The present disclosure improves the PCIe link training procedure, which is defined by the PCI special interest group (PCI-SIG).

The present disclosure includes a number of important technical features. One important technical feature is the introduction of a novel index, which is the effective loss in an add-in card in an optimized transmitter preset algorithm, which will save register space in a second mechanism based on the in-band signal.

Another important technical feature is the definition of a simple supporting identifier to take the place of complex channel information and SerDes capability that may be needed in the first mechanism based on out-of-band signal.

Another important technical feature is a new link procedure that can be used to fix problems with link equalization if there is no supporting identifier in an image of the add-in card. Additional detail about example algorithms and the two mechanisms are provided herein.

In the PCIe link training state, a recovery phase (phase 2 of the transmitter equalization) is used to allow the downstream transmitter to adjust a transmitter equalizer value of the DSC to obtain a lower bit error rate (BER). In general, the algorithm is an adaptive algorithm and the initial value is the transmitter preset. The final transmitter equalizer value is very sensitive with a transmitter preset, but it can arrive at a local optimum value instead of global optimum value if the algorithm is used for non-global convergence.

Another concern of the prior art PCIe transmitter link training procedure is that one transmitter preset value is not suitable for all different add-in cards. In particular, there is a wide range of inter-symbol interference (ISI) channel criteria defined by PCI-SIG. There is also a large difference in the SerDes capability of different add-in cards, which will continue to be a problem for PCIe Gen4 and Gen5.

The in-band signaling embodiment can use one reserved PCIe capability identifier register, and can be based on the protocol level. The out-of-band mechanism embodiment can be supported with a supporting identifier that is stored in the image of the add-in card.

FIG. 1 is a diagram of a system 100 for providing an adaptive transmitter preset mechanism in a PCIe link equalization procedure, in accordance with an example embodiment of the present disclosure. System 100 includes upstream component 102, downstream component 104, upstream out-of-band adaptive transmitter preset system 106, upstream in-band adaptive transmitter preset system 108, downstream out-of-band adaptive transmitter preset system 110, downstream in-band adaptive transmitter preset system 112 and communications medium 114, each of which can be implemented in hardware or a suitable combination of hardware and software.

Upstream component 102 can be an upstream PCIe component, such as a processor or other suitable devices. In one example embodiment, upstream component 102 can include hardware and firmware that allows upstream component 102 to configure downstream component 104 to receive data over a PCIe-compliant communications link. In this example embodiment, upstream component 102 can be configured to implement upstream out-of-band adaptive transmitter preset system 106 and upstream in-band adaptive transmitter preset system 108, such as by downloading and installing firmware that causes upstream out-of-band adaptive transmitter preset system 106 and upstream in-band adaptive transmitter preset system 108 to be implemented in upstream component 102, or in other suitable manners.

Downstream component 104 can be a downstream PCIe component, such as a redundant array of independent disks (RAID) card, a solid-state drive (SSD) card or other suitable devices. In one example embodiment, downstream component 104 can include hardware and firmware that allows upstream component 102 to configure downstream component 104 to receive data over a PCIe-compliant communications link. In this example embodiment, downstream component 104 can be configured to implement downstream out-of-band adaptive transmitter preset system 110 and downstream in-band adaptive transmitter preset system 112, such as by downloading and installing firmware that causes downstream out-of-band adaptive transmitter preset system 110 and downstream in-band adaptive transmitter preset system 112 to be implemented in downstream component 104, or in other suitable manners.

Upstream out-of-band adaptive transmitter preset system 106 can be implemented as one or more algorithms operating on a processor that cause the processor to perform an out-of-band adaptive PCIe process on a downstream component. In one example embodiment, upstream out-of-band adaptive transmitter preset system 106 can perform predetermined functions on a downstream component, such as by loading an equalization settings table using out-of-band communications, by checking an identifier of an add-in card using out-of-band communications, by loading an optimized or default equalization setting using out-of-band communications or in other suitable manners.

Upstream in-band adaptive transmitter preset system 108 can be implemented as one or more algorithms operating on a processor that cause the processor to perform an in-band adaptive PCIe process on a downstream component. In one example embodiment, upstream in-band adaptive transmitter preset system 108 can perform predetermined functions on a downstream component, such as by loading an equalization settings table using in-band communications, by checking an identifier of an add-in card using in-band communications, by loading an optimized or default equalization setting using in-band communications or in other suitable manners.

Downstream out-of-band adaptive transmitter preset system 110 can be implemented as one or more algorithms operating on a processor that cause the processor to perform an out-of-band adaptive PCIe process received from an upstream component. In one example embodiment, upstream out-of-band adaptive transmitter preset system 106 can perform predetermined functions on downstream out-of-band adaptive transmitter preset system 110, such as by loading an equalization settings table using out-of-band communications, by checking an identifier of an add-in card using out-of-band communications, by loading an optimized or default equalization setting using out-of-band communications or in other suitable manners. Downstream out-of-band adaptive transmitter preset system 110 can respond to the functions performed by upstream out-of-band adaptive transmitter preset system 106 to implement the out-of-band adaptive PCIe process.

Downstream in-band adaptive transmitter preset system 112 can be implemented as one or more algorithms operating on a processor that cause the processor to perform an out-of-band adaptive PCIe process received from an upstream component. In one example embodiment, upstream in-band adaptive transmitter preset system 108 can perform predetermined functions on downstream in-band adaptive transmitter preset system 112, such as by loading an equalization settings table using out-of-band communications, by checking an identifier of an add-in card using in-band communications, by loading an optimized or default equalization setting using in-band communications or in other suitable manners. Downstream in-band adaptive transmitter preset system 112 can respond to the functions performed by upstream in-band adaptive transmitter preset system 108 to implement the in-band adaptive PCIe process.

Communications medium 114 can be an in-band communications medium, and out-of-band communications medium or other suitable communications media. In one example embodiment, communications medium 114 can be an in-band communications medium that is compatible with a PCIe communications standard, such as discussed further herein.

In operation, system 100 provides an adaptive transmitter preset mechanism in a PCIe link equalization procedure that can use an in-band communications medium, and out-of-band communications medium or other suitable communications media. System 100 improves the PCIe link training procedure and results in improved signal integrity performance.

FIG. 2 is a diagram of an algorithm 200 for providing an out-of-band adaptive transmitter preset mechanism in a PCIe link equalization procedure, in accordance with an example embodiment of the present disclosure. Algorithm 200 can be implemented on one or more processors.

Algorithm 200 begins at 202, where a system is powered on. In one example embodiment, the upstream component and downstream component involved in a PCIe communications system can be powered by a common power bus, where both are powered on at the same time from a master power control, or other suitable configurations can also or alternatively be used. For example, if the upstream component and the downstream component are powered on separately, then algorithm 200 can include a process whereby the power-on status of both the upstream component and downstream component are verified before proceeding. The algorithm then proceeds to 204.

At 204, an equalization setting table is loaded. In one example embodiment, the equalization setting table can be loaded into one or more data registers of a PCIe upstream component or in other suitable manners. The algorithm then proceeds to 206.

At 206, an identification of an add-in card is checked. In one example embodiment, the identification can be checked using an inter-integrated circuit (I2C) communications process or in other suitable manners. The algorithm then proceeds to 208.

At 208, it is determined whether the identification is present in the equalization setting table. In one example embodiment, a processor or other device operating under algorithmic control can compare the identification to a list of identifiers associated with the equalization setting table, or other suitable processes can also or alternatively be used. If it is determined that the identification is present, the algorithm proceeds to 212, otherwise the algorithm proceeds to 210.

At 210, a default equalization setting is loaded. In one example embodiment, the default equalization setting can be loaded using an out-of-band communications process between the upstream component and the downstream component, a local equalization setting can be used or other suitable processes can also or alternatively be used. The algorithm then proceeds to 214.

At 212, an optimized equalization setting is loaded. In one example embodiment, the optimized equalization setting can be loaded using an out-of-band communications process between the upstream component and the downstream component, a local optimized equalization setting can be used or other suitable processes can also or alternatively be used. The algorithm then proceeds to 214.

At 214, the PCIe link is enabled. In one example embodiment, the PCIe link can be enabled using the I2C communications medium, using the PCIe communications medium, or in other suitable manners.

In operation, algorithm 200 provides an out-of-band adaptive transmitter preset mechanism in a PCIe link equalization procedure. Although algorithm 200 is shown as a flow chart, it can also or alternatively be implemented as an object oriented diagram, a state diagram, a ladder diagram or in other suitable manners.

FIG. 3 is a diagram of an algorithm 300 for providing an in-band adaptive transmitter preset mechanism in a PCIe link equalization procedure, in accordance with an example embodiment of the present disclosure. Algorithm 300 can be implemented on one or more processors.

Algorithm 300 begins at 302, where power is turned on. In one example embodiment, the upstream component and downstream component involved in a PCIe communications system can be powered by a common power bus, where both are powered on at the same time from a master power control, or other suitable configurations can also or alternatively be used. For example, if the upstream component and the downstream component are powered on separately, then algorithm 300 can include a process whereby the power-on status of both the upstream component and downstream component are verified before proceeding. The algorithm then proceeds to 304.

At 304, a PCIe maximum speed is changed. In one example embodiment, the PCIe maximum speed can be changed using a link capability register to a Gen 1 setting, or other suitable processes can also or alternatively be used. The algorithm then proceeds to 306.

At 306, a PCIe link is enabled. In one example embodiment, the PCIe link can be enabled over a communications medium such as the PCIe communications medium or in other suitable manners. The algorithm then proceeds to 308.

At 308, an effective ISI is read. In one example embodiment, the effective ISI information that is defined in the capability identifiers register can be read, or other suitable processes can be used. The algorithm then proceeds to 310.

At 310, an optimized transmitter preset is calculated. In one example embodiment, the optimized transmitter preset can be calculated at the upstream component or in other suitable manners, and can result in a boost in an optimized transmitter preset that is equal to the loss of server/baseboard plus the effective loss in the add-in card. The effective loss in the add-in card can equal the loss of the add-in card minus the minimum equalization of the DSC's continuous time linear equalization. The algorithm then proceeds to 312.

At 312, the preset is changed. In one example embodiment, the preset can be changed by storing a new preset value in a predetermined data register or in other suitable manners. The algorithm then proceeds to 314.

At 314, the PCIe link is disabled. In one example embodiment, the PCIe link can be disabled by an in-band adaptive transmitter preset system at the upstream component and/or downstream component, by using in-band PCIe signaling, by using I2C signaling or in other suitable manners. The algorithm then proceeds to 316.

At 316, the PCIe maximum speed is set to the default value. In one example embodiment, the default value has been changed to an optimized value, so that the default value results in improved signal integrity performance. The algorithm then proceeds to 318.

At 318, the PCIe link is enabled. In one example embodiment, the PCIe link can be enabled using a communications medium such as the PCIe communications medium, or in other suitable manners.

In operation, algorithm 300 provides an in-band adaptive transmitter preset mechanism in a PCIe link equalization procedure. Although algorithm 300 is shown as a flow chart, it can also or alternatively be implemented as an object oriented diagram, a state diagram, a ladder diagram or in other suitable manners.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for data communications, comprising:
   an upstream component configured to select between an in-band peripheral component interconnect express (PCIe) equalization procedure and an out-of-band PCIe equalization procedure;
   a downstream component configured to respond to the selected one of the in-band PCIe equalization procedure or the out-of-band PCIe equalization procedure to enable PCIe communications with the upstream component as a function of an add-in card identifier; and wherein the downstream component further comprises an downstream in-band adaptive transmitter preset system configured to perform the in-band PCIe equalization procedure using the add-in card identifier to obtain equalization setting data from an equalization setting table.

2. The system of claim 1 wherein the upstream component further comprises an upstream out-of-band adaptive transmitter preset system configured to perform the out-of-band PCIe equalization procedure.

3. The system of claim 1 wherein the upstream component further comprises an upstream in-band adaptive transmitter preset system configured to perform the in-band PCIe equalization procedure.

4. The system of claim 1 wherein the downstream component further comprises a downstream out-of-band adaptive transmitter preset system configured to perform the out-of-band PCIe equalization procedure using the equalization setting table.

5. A method for data communications, comprising: selecting between one of an in-band peripheral component interconnect express (PCIe) equalization procedure and an out-of-band PCIe equalization procedure at an upstream component;
   responding to the selected one of the in-band PCIe equalization procedure or the out-of-band PCIe equalization procedure at a downstream component configured to enable PCIe communications with the upstream component; and wherein selecting the out-of-band PCIe equalization procedure further comprises determining whether an identification of an add-in card is in an equalization setting table by comparing the identification of the add-in card to data in the equalization setting table.

6. The method of claim 5 wherein selecting the out-of-band PCIe equalization procedure further comprises loading the equalization setting table containing a plurality of add-in card identifiers.

7. The method of claim 6 wherein selecting the out-of-band PCIe equalization procedure further comprises checking the identification of the add-in card after loading the equalization setting table to obtain equalization setting data.

8. The method of claim 5 wherein selecting the out-of-band PCIe equalization procedure further comprises loading a default equalization setting if the identification of the add-in card is not in the equalization setting table.

9. The method of claim 5 wherein selecting the out-of-band PCIe equalization procedure further comprises loading an optimized equalization setting based on the identification if the identification of the add-in card is in the equalization setting table.

10. The method of claim 5 wherein selecting the in-band PCIe equalization procedure further comprises changing a PCIe max speed.

11. The method of claim 10 wherein selecting the in-band PCIe equalization procedure further comprises enabling a PCIe link.

12. The method of claim 11 wherein selecting the in-band PCIe equalization procedure further comprises reading effective inter-symbol interference information.

13. The method of claim 12 wherein selecting the in-band PCIe equalization procedure further comprises calculating an optimized transmitter preset.

14. The method of claim 13 wherein selecting the in-band PCIe equalization procedure further comprises and changing the transmitter preset to the optimized transmitter preset.

15. The method of claim 14 wherein selecting the in-band PCIe equalization procedure further comprises disabling the PCIe link.

16. The method of claim 15 wherein selecting the in-band PCIe equalization procedure further comprises changing the PCIe max speed to the optimized transmitter preset.

17. The method of claim 16 wherein selecting the in-band PCIe equalization procedure further comprises enabling the PCIe link using an I2C communications medium.

18. The system of claim 1 wherein the upstream component further comprises an upstream out-of-band adaptive transmitter preset system configured to perform the out-of-band PCIe equalization procedure and an upstream in-band adaptive transmitter preset system configured to perform the in-band PCIe equalization procedure.

19. The method of claim 5 wherein selecting the out-of-band PCIe equalization procedure further comprises loading a default equalization setting if the identification of the add-in card is not in the equalization setting table and selecting the in-band PCIe equalization procedure further comprises changing a PCIe max speed.

20. The method of claim 5 wherein selecting the out-of-band PCIe equalization procedure further comprises loading an optimized equalization setting based on the identification if the identification of the add-in card is in the equalization setting table and selecting the in-band PCIe equalization procedure further comprises changing a PCIe max speed.

* * * * *